United States Patent [19]

Smith et al.

[11] 3,723,521

[45] Mar. 27, 1973

[54] PROCESS FOR THE PREPARATION OF 1-HALOPHOSPHOLENES

[75] Inventors: Curtis P. Smith, Cheshire; Henri Ulrich, North Branford, both of Conn.

[73] Assignee: The Upjoin Company, Kalamazoo, Mich.

[22] Filed: June 1, 1971

[21] Appl. No.: 148,998

[52] U.S. Cl. ............................260/543 P, 260/936
[51] Int. Cl. ............................................C07d 105/02
[58] Field of Search ..................................260/543 P

[56] References Cited

UNITED STATES PATENTS 2,685,602   8/1954   Woodstock et al. ..............260/543 P

FOREIGN PATENTS OR APPLICATIONS 1,011,974   12/1965   Great Britain ....................260/543 P 210,155   6/1968   U.S.S.R. ............................260/543 P

*Primary Examiner*—Lorraine A. Weinberger
*Assistant Examiner*—Richard D. Kelly
*Attorney*—Denis A. Firth, John Kekich and Joseph T. Eisele

[57] ABSTRACT

Diels-Alder reaction adducts of a conjugated diene and a member of the group consisting of phosphorus trichloride, phosphorus tribromide and phosphorus triiodide are reduced with white phosphorus in an inert organic solvent, to prepare the corresponding 1-halophospholenes. The products of the process are novel compounds, useful as intermediates in the preparation of selective solvents and catalysts for the preparation of carbodiimides from isocyanates.

7 Claims, No Drawings

PROCESS FOR THE PREPARATION OF 1-HALOPHOSPHOLENES

BACKGROUND OF THE INVENTION

1. Field of the Invention

The invention is concerned with a process for preparing novel heterocyclic phosphorus compounds, and is more particularly concerned with a process for preparing 1-halophospholenes from the corresponding 1,1-dihalophospholenium halide.

2. Description of the Prior Art

The preparation of 1-halophospholenes by the disclosed process has not been described prior to our invention. Subsequent to our invention, the preparation of 1-bromo-3-phospholene was described in a communication by Quin et al., J. Am. Chem. Soc., 92, 5779, (1970). Also subsequent to our invention, the preparation of 1-halophospholenes was described by Myers et al., J. Org., Chemistry, 36, 1285–90, (1971).

SUMMARY OF THE INVENTION

The invention comprises a process which comprises reacting, in the presence of an inert organic solvent, A. a 1:1 adduct prepared by the Diels-Alder reaction of a conjugated diene with a member selected from the group consisting of phosphorus trichloride, phosphorus tribromide and phosphorus triiodide; and B. white phosphorus;

whereby there is obtained the corresponding 1-halo phospholene.

The products of the process are for the most part novel compounds, useful as intermediates in a variety of syntheses. For example, the products of the process may be used in preparing selective solvents and in obtaining catalysts for the preparation of carbodiimides from isocyanates. Methods of preparing useful compounds from the products of the process are discussed in more detail hereinafter.

DETAILED DESCRIPTION OF THE INVENTION

The 1:1 Diels-Alder reaction adducts used in the process of the invention can be prepared by the method of Hasserodt et al., Tetrahedron, Vol. 19, pps. 1563–75 (1963). In general, the method comprises reacting approximately equimolar proportions of a conjugated diene with a phosphorus trihalide in the presence of a compound, such as copper stearate, which will inhibit polymerization of the diene reactant. Any conjugated diene which will undergo the well known Diels-Alder reaction may be employed. Conjugated dienes capable of undergoing Diels-Alder reactions are discussed in the text Newer Methods of Preparative Organic Chemistry by Kurt Alder, Interscience Publishers, Inc. (1948), in the chapter "The Diene Synthesis" beginning on page 331. A brief discussion of such conjugated dienes may also be found in U.S. Pat. No. 2,663,737. Preferred dienes employed in the preparation of corresponding Diels-Alder reaction adducts as used in the process of the invention have the general formula:

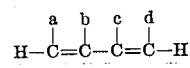
(I)

wherein $a$, $b$, $c$ and $d$ are each selected from the group consisting of hydrogen, halogen, alkoxy of one to six carbon atoms, inclusive, phenoxy, hydrocarbyl and halogen substituted hydrocarbyl; said hydrocarbyl having one to six carbon atoms inclusive.

The term "hydrocarbyl" as used herein means the monovalent radical obtained by removing one hydrogen atom from the parent hydrocarbon, which latter contains one to six carbon atoms. Illustrative of such hydrocarbyl groups is alkyl of one to six carbon atoms, inclusive, such as methyl, ethyl, propyl, butyl, pentyl and hexyl including isomeric forms thereof; alkenyl of two to six carbon atoms, inclusive, such as vinyl, allyl, butenyl, pentenyl, hexenyl including isomeric forms thereof; and phenyl.

The term "halogen" is used throughout this specification and claims in its generally accepted sense as embracing chlorine, bromine, iodine and fluorine.

The term "halogen substituted hydrocarbyl" means those hydrocarbyl groups as before defined wherein from one to all of the hydrogen atoms have been replaced by halogen as defined above. Illustrative of halogen substituted hydrocarbyl are chloromethyl, trichloromethyl, 2-chloroethyl, 2-bromoethyl, 1-chlorobutyl, 2-bromohexyl, 2-chlorobutenyl, 1,1,1-trifluorohexenyl, p-chlorophenyl, 2,5-diiodophenyl and the like.

The term "alkoxy of one to six carbon atoms, inclusive" means a radical of formula —O—R wherein R is alkyl of one to six carbon atoms, inclusive, as above defined, Illustrative of alkoxy of one to six carbon atoms, inclusive, is methoxy, ethoxy, propoxy, butoxy, pentyloxy and hexyloxy including isomeric forms thereof.

Conjugated dienes which will undergo the Diels-Alder reaction are for the most part well known compounds. They may be prepared by a variety of well known methods, illustrated for example by the method of Makin, et al., Zhur, Obschchei Khim., Vol. 30, pps. 3276–80 (1960) and those methods discussed in E. H. Rodd, Elsevier Publishing Co., N.Y., (1951) Vol. II, pps. 267–9. The halogen-substituted conjugated dienes may be prepared by substitution halogenation of the corresponding non-halogenated hydrocarbon using known methods; see for example E. H. Rodd, supra pps. 274–84.

Although it should be understood that any Diels-Alder reaction adduct of a conjugated diene with phosphorus trichloride, phosphorus tribromide or phosphorus triiodide may be used in the process of the invention, the structural formula of said adduct is conveniently illustrated by those prepared from the preferred dienes (I). The structure of these latter adducts is generally represented by the schematic formula:

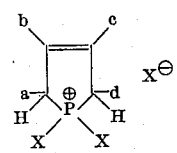
(II)

wherein a, b, c and d are as before defined; X is chlorine, bromine or iodine and corresponds to the halogen in the phosphorus trihalide, employed in preparing compounds (II).

In the early literature, the ionic nature of compounds illustrated by the formula (II) WAS NOT APPRECIATED AND SO THEY ARE SOMETIMES REFERRED TO AS 1,1,1--trihalophospholenes. The system of nomenclature used throughout the specification and claims is illustrated by the following examples:

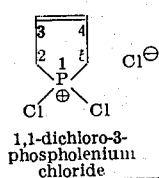
1,1-dichloro-3-phospholenium chloride

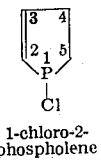
1-chloro-2-phospholene

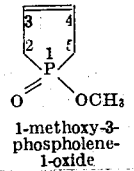
1-methoxy-3-phospholene-1-oxide

Historically, adducts formed by the Diels-Alder reaction of a 1,3-diene were assigned a structure having the double bond in the 3 position. It is known that when phospholenium halides undergo reaction, for example reduction, the product comprises proportions of 1-halo-2-phospholenes. It is therefore possible that the Diels-Alder reaction compound of formula (II) also exists in an isomeric form where the double bond is in the 2 position or as a mixture or an equilibrium mixture of both isomers. It is to be understood therefore, that the Diels-Alder reaction adducts illustrated by the general formula (II) above are intended to embrace and represent all the possible adduct isomers prepared by the Diels-Alder reaction of a conjugated diene with the appropriate phosphorus trihalide.

By the process of the invention, the phosphorus atom in the Diels-Alder adduct is reduced from the pentavalent to the trivalent state, with partial dehalogenation of the compound. Employing the formula (II) illustratively, the reaction may be represented schematically by the equation:

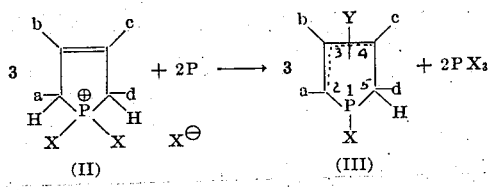

wherein a, b, c, d and X are as before defined. The dotted lines shown in the formula (III) indicate that a double bond is located between the carbon at position 3 and one of the two carbons at positions 2 and 4; Y is hydrogen and is attached to whichever of the carbon atoms at positions 2 and 4 is not part of said double bond. The dotted line is present in the above formula (III) to show that the product of the process of the invention can exist in the two structural isomeric forms, that is the 2-phospholene and the 3-phospholene isomeric forms. A mixture of these two isomeric forms is generally obtained in the process of the invention. Reference hereafter to the 1-halophospholenes obtained by the process of the invention is intended to embrace both the 2- and 3- isomers unless otherwise stated. The relative proportions of each of the product isomers obtained by the process of the invention will vary from trace amounts to nearly 100 percent of the total product.

The relative proportions of the 2- and 3- isomers obtained by the process of the invention appears to be determined by the nature of the substituents a, b, c, d and X. Both isomeric products are useful, and may be employed for some purposes in admixture, or when desired, they may be separated by conventional methods such as distillation, chromatographic separation, countercurrent extraction and like techniques.

The process of the invention is carried out by admixing substantially stoichiometric proportions of the Diels-Alder adduct with the phosphorus in an inert organic solvent. When it is desired to reduce the hazards associated with the handling of white phosphorus, the Diels-Alder adduct reactant may be employed in excess of stoichiometric requirements to assure complete utilization of elemental phosphorus.

An inert organic solvent as used in the process of the invention is one which does not itself enter into reaction with any of the reactants or otherwise interfere with the expected course of the reaction which comprises the process of the invention. Illustrative of such solvents are the aliphatic hydrocarbons such as n-hexane, cyclohexane and the like; aromatic hydrocarbons such as benzene, toluene, xylene and the like; and the chlorinated hydrocarbon solvents such as methylene chloride, chloroform, carbon tetrachloride, 1,2-dichloroethane, chlorobenzene and the like. Preferred as the inert organic solvent in the process of the invention is benzene. The amount of inert organic solvent employed in the process of the invention is not critical and is governed generally by the requirement that preferably there should be sufficient solvent present in the reaction mixture to maintain the reaction product in solution while the reaction is in progress.

The reactants are brought together and mixed using conventional apparatus and techniques for mixing elemental phosphorus in a solvent mixture. Since the Diels-Alder reaction adducts are generally insoluble or only slightly soluble in the inert organic solvents discussed above, it is highly desirable to employ a reaction vessel fitted with means for continually stirring the reaction mixture during the course of reaction. Initially the reactants are present as a slurry in the reaction vessel but, as the reaction proceeds and the reaction product goes into solution, the amount of insoluble material decreases and generally disappears eventually, leaving a clear solution of reaction product with a relatively small amount of insoluble by-product.

The reaction proceeds slowly at ambient temperatures, and so it is preferred that the reaction mixture be heated to increase the rate of reaction. The temperature range employed in the process may be from about 25° C to reflux temperature for the particular reaction mixture. The preferred temperature range is about 40° C to reflux temperature.

The products of the process are generally susceptible to oxidation on exposure to air, particularly when heated. It is therefore preferred that the process of the invention be carried out under an inert atmosphere such as nitrogen gas, particularly when the reaction mixture is to be heated. Similarly, the recoverable yield of 1-halophospholene products of the process is increased when the process of the invention is carried out under anhydrous conditions, using conventional techniques. That is, by excluding sources of moisture during the process and by drying solvents and reactants prior to admixture.

It is preferred that a catalyst be added to the reaction mixture to promote the reaction. Phosphorus tribromide will catalyze the reaction when the phospholenium halide (II) employed in the process is a 1,1-dichloro-3-phospholenium chloride. The preferred catalyst is iodine which will act as a catalyst in the process of the invention without regard to the specific reactants employed. When employing iodine as a catalyst in the process of the invention, it is preferable that it be added to the reaction mixture in the form of an organic charge-transfer complex. Iodine-organic charge-transfer complexes are well known, and prepared by reacting the iodine with at least an equimolar proportion of an organic compound such as benzene, toluene, xylene, cyclohexane and like organic compounds (see for example Organic Charge-Transfer Complexes, Foster, Academic Press, New York, New York, 1961, and Cromwell et al. J. Am., Soc., Vol. 72 pg. 3825). When the preferred solvent, i.e. benzene, is employed in the process of the invention, this preferred embodiment is conveniently obtained by adding the iodine directly to the benzene solvent. The catalyst is employed in a catalytic proportion, which is generally between about 0.01 molar percent to about 2.0 molar percent based on the proportion of Diels-Alder adduct reactant (II) employed in the reaction mixture.

The progress of the reaction can be followed by conventional analytical techniques such as infra-red spectral analysis and nuclear magnetic resonance analysis. The latter technique for example will show reaction occurring by the appearance of absorption spectra characteristic of the product compounds. Completion of the reaction may also be observed visually, by observing the conversion of the reaction mixture from a slurry of generally insoluble Diels-Alder adduct to a clear solution of product compounds containing a solid precipitate of phosphorus compound by-products.

Upon completion of the reaction the desired product (III) is recovered therefrom by conventional techniques. For example, the reaction mixture is filtered, preferably using apparatus and techniques which exclude air and moisture from contacting the filtrate. The 1-halophospholene product compounds (III) are then isolated from the filtrate employing standard techniques such as evaporation of solvent, distillation and like procedures.

The following examples describe the manner and process of making and using the invention, and set forth the best mode contemplated by the inventors of carrying out the invention, but are not to be construed as limiting.

EXAMPLE 1

A reactor vessel fitted with a means for stirring is charged with 30.0 gms (0.146 moles) of 1,1-dichloro-3-methyl-3-phospholenium chloride ( Hasserodt et al., supra), 2.1 gms. (0.068 moles) of white phosphorus (freshly washed with acetone and then benzene) and 100 ml. of benzene. The air in the vessel is replaced with nitrogen gas. While continually stirring the mixture, it is cooled in ice, and 0.17 gms. of iodine is added. Upon completion of the iodine addition, the mixture is gradually heated over a period of about 30 minutes to reflux temperature and refluxed, under a blanket of nitrogen gas, for about 30 minutes. Within the first 5 minutes of refluxing the slurry mixture becomes a clear solution containing a gum like solid. After the period of reflux, the reaction mixture is cooled to room temperature, and allowed to stand overnight. The supernatant liquid is then decanted and distilled under a pressure of 15 mm. of Hg and at a temperature of 69° C, to yield 5.4 gms. of a colorless distillate which is found by nuclear magnetic resonance analysis to be 72 percent by weight (28 percent of theory) of 1-chloro-3-methyl-2-phospholene. The structure assigned to the product is confirmed by proton nuclear magnetic resonance analysis which shows the characteristic doublet of $J_{PCH}$ 46.5 Hz at $\delta$ 5.94 PPM (Benzene). The product has a $\delta P^{31} - 134.2$ (neat) relative to 85 percent phosphoric acid. Infra-red analysis shows the characteristic olefinic absorption at 6.21 $\mu$ ($CH_2Cl_2$).

The desired 1-chloro-3-methyl-2-phospholene is separated from the crude distillate by fractional distillation at a pressure of 12 mm of Hg and a temperature of circa 60°–65° C.

EXAMPLE 2

A reactor vessel fitted with a means for stirring is charged with 9.0 gms. (0.290 moles) of white phosphorus (freshly washed with acetone and then benzene) and 50 ml. benzene. To this mixture is added 93.8 gms. (0.428 moles) of 1,1-dichloro-3,4-dimethyl-3-phospholenium chloride (Hasserodt et al., supra), 0.23 gms of iodine and an additional 50 ml. of benzene. With continuous stirring the reaction mixture is refluxed for about 45 minutes. Within the first 5 minutes of refluxing, the reaction slurry changes to a clear solution containing a gum-like solid. After reflux the reaction mixture is cooled to room temperature and the supernatant liquid decanted. The supernatant is distilled under a pressure of 20 mm. of Hg and at a temperature of 97° C to give 12.1 gms (19 percent of theory) of a colorless distillate which is a mixture containing 42.7 percent of 1-chloro-3,4-dimethyl-2-phospholene and 57.3 percent of 1-chloro-3,4-dimethyl-3-phospholene. The assigned structure and isomer proportion is confirmed by proton nuclear magnetic resonance analysis which shows the characteristic doublet of $J_{PCH}$ 45.6 Hz at $\delta$ 6.01 PPM ($CDCl_3$) for the 2-isomer and doublet of $J_{PCH}$ 20.0 Hz at $\delta$ 2.78 PPM ($CDCl_3$) for the 3-isomer. The 2-phospholene isomer has $\delta P^{31}$ -111.5 (neat), relative to 85% phosphoric acid. The 1-chloro-3,4-dimethyl-2-phospholene is separated from the 3-phospholene isomer by fractional distillation under reduced pressure.

Similarly, following the above procedure but replacing the iodine as used therein with a catalytic proportion of phosphorus tribromide there is obtained a mixture of 1-chloro-3,4-dimethyl-3-phospholene and 1-chloro-3,4-dimethyl-2-phospholene.

EXAMPLE 3

A reactor vessel fitted with a means for stirring is charged with 21.2 gms (0.103 moles) of 1,1-dichloro-3-methyl-3-phospholenium chloride (Hasserodt et al., supra), 1.9 gms. (0.06 moles) of white phosphorus (freshly washed with acetone and then benzene) and 100 ml. of benzene. The air in the reactor vessel is replaced with nitrogen gas and the reaction mixture is refluxed while being continuously stirred under a blanket of nitrogen gas. After about 5 minutes, the reaction mixture slurry is transformed into a clear solution containing a gum-like material. After about 45 minutes the reaction mixture is cooled to room temperature and filtered. The filtrate is a mixture of benzene solvent and 1-chloro-3-methyl-2-phospholene. Presence of the desired 1-chloro-3-methyl-2-phospholene product in the filtrate is confirmed by proton nuclear magnetic resonance analysis which shows the characteristic doublet of $J_{PCH}$ 46.6 Hz at δ 5.78 PPM (Benzene). The desired 1-chloro-3-methyl-2-phospholene in the form of a colorless liquid is isolated from the filtrate mixture by distillation under a pressure of circa 22 mm. of mercury and at a temperature of about 70° C to 80° C.

Similarly, but replacing the 1,1-dichloro-3-methyl-3-phospholenium chloride as used above with an equal molar proportion of the following phospholenium chlorides:

1,1-dichloro-;
1,1-dichloro-2,3,4,5-tetrabromo-;
1,1-dichloro-3-(4-chloro-4-methylpentyl)-;
1,1-dichloro-3-chloromethyl-;
1,1-dichloro-5-(1,2-dibromoethyl)-;
1,1-dichloro-4-(4-methyl-3-pentenyl)-;
1,1-dichloro-3,4-dimethoxy-;
1,1-dichloro-5-isopentoxy-;
1,1-dichloro-3-phenyl-; and
1,1-dichloro-2-p-bromophenyl-3-phospholenium chloride, respectively, (all of which are prepared by reaction of the appropriate conjugated diene of formula (I) with phosphorus trichloride, according to the procedure of Hasserodt et al., supra), there are obtained corresponding mixtures of 1-chloro-2- and 1-chloro-3-phospholene; 1-chloro-2,3,4,5-tetrabromo-2- and 1-chloro-2,3,4,5-tetra-bromo-3-phospholene; 1-chloro-3-(4-chloro-4-methylpentyl) -2- and 1-chloro-3(4-chloro-4-methylpentyl)-3-phospholene; 1-chloro-3-chloromethyl-2- and 1-chloro-3-chloromethyl-3-phospholene; 1-chloro-5-(1,2-dibromoethyl) -2- and 1-chloro-5- (1,2-dibromoethyl)-3-phospholene; 1-chloro-4-(4-methyl-3-pentenyl) -2- and 1-chloro-4-(4-methyl-3-pentenyl)-3-phospholene; 1-chloro-3,4-dimethy-2- and 1-chloro-3,4-dimethoxy-3-phospholene; 1-chloro-5-isopentoxy-2- and 1-chloro-5-isopentoxy-3-phospholene; 1-chloro-3-phenyl -2- and 1-chloro-3 -phenyl-3 phospholene; and 1-chloro-2-p-bromophenyl-2- and 1-chloro-2-p-bromophenyl-3-phospho-lene respectively.

Similarly, using the above procedure but replacing the 1,1-dichloro-3-methyl-3-phospholenium chloride as used therein with an equal molar proportion of:

1,1-dibromo-;
1,1-dibromo-3-methyl-;
1,1-dibromo-3,4-dimethyl-;
1,1-dibromo-3-(4-chloro-4-methylpentyl)-;
1,1-dibromo-4-(4-methyl-3-pentenyl)-;
1,1-dibromo-3,4-dimethoxy-;
1,1-dibromo-5-(2-chloroethoxy)-;
1,1-dibromo-2,3,5-triphenyl-;
and 1,1-dibromo-2-p-bromophenyl-3-phospholenium bromide, respectively, (All of which are prepared by reaction of the appropriate conjugated diene of formula (I) with phosphorus tribromide, following the procedure of Hasserodt et al., supra) there are obtained the corresponding mixtures of the appropriately substituted 1-bromo-3-phospholene and 1-bromo-2-phospholene.

Similarly, using the above procedure but replacing the 1,1-dichloro-3-methyl-3-phospholenium chloride as used therein with an equal molar proportion of 1,1-diiodo-3-chloro-;
1,1-diiodo-3-methyl-;
1,1-diiodo-3,4-dimethyl-;
1,1-diiodo-3-propyl-;
1,1-diiodo-3-chloromethyl-;
1,1-diiodo-5-(1,2-dibromoethyl)-;
1,1-diiodo-4-(4-methyl-3-pentenyl)-;
1,1-diiodo-3,4-dimethoxy-;
1,1-diiodo-5-isopentoxy-;
1,1-diiodo-3-phenyl-;
and 1,1-diiodo-2-p-bromophenyl-3-phospholenium iodide, respectively, (All of which are prepared by reaction of the appropriate conjugated diene of formula (I) with phosphorus triiodide, following the procedure of Hasserodt et al., supra.) there is obtained the corresponding mixture of the appropriately substituted 1-iodo-3-phospholene and 1-iodo-2-phospholene.

The 1-halophospholene compounds prepared by the process of the invention are useful as intermediates in a number of syntheses. Illustratively, following the procedure of Hasserodt et al., supra, for preparing phospholene-1-oxides; the 1-halophospholene products may be reacted with aliphatic alcohols such as methanol, ethanol, propanol, butanol and the like or with phenol. The reaction is carried out in the presence of air and a tertiary amine acid acceptor such as a trialkylamine to give the corresponding 1-alkoxyphospholene-1-oxides, which compounds are useful as catalysts in the conversion of isocyanates to carbodiimides. For example, when 1-bromo-3-methyl-3-phospholene as obtained in Example 3 above is reacted with methanol in the presence of triethylamine and air, the product is 1-methoxy-3-methyl-3-phospholene-1-oxide, which is a known catalyst for preparing carbodiimides from isocyanates (Arbuzov et al., Doklady Akademii Nauk SSSR. Vol. 170, No. 3, pps. 585–588, Sept. 1966). Similarly, 1-chloro-3-methyl-2-phospholene as obtained in Examples 1 and 3 may be reacted with methanol following the procedure of Hasserodt et al., supra, to prepare 1-methoxy-3-methyl-2-phospholene-1-oxide which is a selective solvent for the extraction of aromatics (see U.S. Pat. No. 3,345,287).

We claim:

1. A process which comprises reacting, in the presence of an inert organic solvent, A. a 1:1 adduct prepared by the Diels-Alder reaction of a conjugated diene with a member selected from the group consisting of phosphorus trichloride, phosphorus tribromide and phosphorus triiodide; and B. white phosphorus; whereby, there is obtained the corresponding 1-halophos-pholene.

2. The process of claim 1 wherein said starting adduct (A) is of formula:

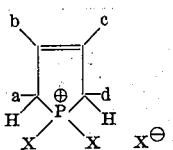

wherein $a$, $b$, $c$ and $d$ are each selected from the group consisting of hydrogen, halogen, alkoxy of one to six carbon atoms, inclusive, phenoxy, hydrocarbyl and halogen substituted hydrocarbyl, said hydrocarbyl having one to six carbon atoms, inclusive; X is selected from the group consisting of chlorine, bromine and iodine; whereby there is obtained the corresponding 1-halophospholene having the formula:

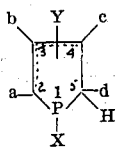

wherein $a$, $b$, $c$, $d$ and X are as above defined; the dotted line indicates that a double bond is located between the carbon at position 3 and one of the two carbons at positions 2 and 4; and y is hydrogen attached to whichever of the carbon atoms at positions 2 and 4 is not part of said double bond.

3. The process of claim 1 wherein said inert organic solvent is benzene.

4. The process of claim 3 wherein said process is carried out in the presence of a catalytic proportion of iodine.

5. The process of claim 1 wherein the reaction mixture is heated to a temperature of from about 40°C to reflux temperature.

6. The process of claim 1 wherein said adduct is 1,1-dichloro-3-methyl-3-phospholenium chloride and the product of the process is a mixture of 1-chloro-3-methyl-2-phospholene and 1-chloro-3-methyl-3-phospholene.

7. The process of claim 1 wherein said adduct is 1,1-dichloro-3,4-dimethyl-3-phospholenium chloride and the product of the process is a mixture of 1-chloro-3,4-dimethyl-2-phospholene and 1-chloro-3,4-dimethyl-3-phospholene.

* * * * *